United States Patent [19]

Yanai et al.

[11] Patent Number: 5,708,784
[45] Date of Patent: Jan. 13, 1998

[54] DUAL BUS COMPUTER ARCHITECTURE UTILIZING DISTRIBUTED ARBITRATORS AND METHOD OF USING SAME

[75] Inventors: Moshe Yanai, Framingham; Natan Vishlitzky, Brookline; Bruno Alterescu, Newton; Daniel Castel, Framingham, all of Mass.

[73] Assignee: EMC Corporation, Hopkinton, Mass.

[21] Appl. No.: 803,290

[22] Filed: Feb. 20, 1997

Related U.S. Application Data

[63] Continuation of Ser. No. 799,107, Nov. 27, 1991, abandoned.

[51] Int. Cl.$^6$ .................................................. G06F 13/368
[52] U.S. Cl. .......................... 395/299; 395/308; 395/728; 395/730
[58] Field of Search ........................ 395/299, 293, 395/730, 728, 729, 800, 182.02, 182.09, 182.19, 433; 364/240.2, 242.6

[56] References Cited

U.S. PATENT DOCUMENTS

| | | | |
|---|---|---|---|
| 4,365,295 | 12/1982 | Kateman et al. | 364/DIG. 1 |
| 4,402,040 | 8/1983 | Evett et al. | 364/DIG. 1 |
| 4,472,771 | 9/1984 | Bienvenu et al. | 364/DIG. 1 |
| 4,695,952 | 9/1987 | Howland | 364/200 |
| 4,760,521 | 7/1988 | Rehwald et al. | 395/433 |
| 4,771,286 | 9/1988 | Niessen et al. | 340/825.52 |
| 4,787,033 | 11/1988 | Bomba et al. | 364/DIG. 1 |
| 4,837,739 | 6/1989 | McGill et al. | 364/900 |
| 4,853,846 | 8/1989 | Johnson et al. | 364/200 |
| 4,979,100 | 12/1990 | Makris et al. | 364/DIG. 1 |
| 5,175,841 | 12/1992 | Magar et al. | 395/425 |
| 5,418,967 | 5/1995 | Simcoe et al. | 395/729 |
| 5,463,740 | 10/1995 | Taniai et al. | 395/299 |

OTHER PUBLICATIONS

Q. Yang and R. Ravi, "Design and Analysis of Multiple–Bus Arbiters With Different Priority Schemes", *Parabase–90 International Conference on Databases, Parallel Architectures & Their Applications*, Mar. 1990, pp. 238–247.

Mahmud et al., "Fault Tolerant Arbiters for Synchronous Multiple Bus Systems", IEEE, Apr. 1991, pp. 1045–1048.

*Primary Examiner*—Alyssa H. Bowler
*Assistant Examiner*—Walter D. Davis
*Attorney, Agent, or Firm*—Mark J. Casey, Esq.; John M. Gunther, Esq.

[57] ABSTRACT

A dual bus architecture for a computer system including a number of computer system devices and a number of computer system resources. Each of the computer system devices and computer system resources are coupled by first and second communication busses. First and second bus arbitrators provide bus arbitration functions allowing first and second computer system devices to access first and second computer system resources simultaneously. A method of accessing a number of computer system resources by a number of computer system devices coupled by a dual bus architecture is also provided.

16 Claims, 3 Drawing Sheets

5,708,784

DUAL BUS COMPUTER ARCHITECTURE UTILIZING DISTRIBUTED ARBITRATORS AND METHOD OF USING SAME

This is a continuation of application Ser. No. 07/799,107, filed Nov. 27, 1992, now abandoned.

FIELD OF THE INVENTION

This invention relates to computer system architecture and more particularly, to a computer system with dual, parallel computer busses.

BACKGROUND OF THE INVENTION

Prior art computer systems typically employ a single bus architecture. Such an architecture provides for only one address and data bus. If the bus is busy servicing one device, other devices requiring access to the bus must wait their turn. Such waiting dramatically affects system throughput and performance. Most problematic, however, is that a failure of the bus or in some instances, of a device connected to the bus, will generally completely impair operation of the system.

Other prior art systems employing multiple busses generally merely separate the functions of the bus into several busses performing specialized functions, or alternatively, provide a number of busses with a master/slave bus relationship. In both cases, two devices cannot simultaneously access and share a common resource. Additionally, a failure in one of the busses will significantly if not completely impair operation of at least a portion of the entire system.

SUMMARY OF THE INVENTION

Accordingly, the dual computer bus architecture of the present invention greatly increases system performance while providing complete bus redundancy by virtue of the dual busses, while data accessibility and integrity are maintained at all times.

This invention features a dual bus architecture for a computer system including a number of computer system devices operative for accessing a computer system resource over a communication bus. Also included are a plurality of computer system resources each of which is accessible by each of the computer system devices over first and second communication busses. The communication busses couple each of the computer system devices to each of the computer system resources, to allow access to a first one of the computer system resources by a selected first one of the computer system devices over the first communication bus, and for simultaneously allowing access to a second one of the computer system resources by a second one of the computer system devices over the second communication bus.

A first bus access arbitrator is provided for selecting the first one of the computer system devices to access the first one of the computer system resources over the first communication bus, while a second bus access arbitrator selects the second one of the computer system devices to access the second one of the computer system resources over the second communication bus simultaneously with access of the first computer system resource performed by the first computer system device.

In the preferred embodiment, each of the computer system devices includes a bus arbitrator. The system designates two of the bus arbitrators as the first and second bus arbitrators respectively. The system may further include a bus arbitrator assignor for assigning bus arbitration functions of the first and second communication busses to first and second bus arbitrators, and for reassigning bus arbitrators should one device or bus arbitrator fail.

This invention also features a method of accessing a plurality of computer system resources by a plurality of computer system devices, all coupled by first and second communication busses. The method includes requesting access to a first computer system resource by a first one of the computer system devices and determining whether the first communication bus is busy or not busy. If the first communication bus is not busy and if the requested resource is not busy, the first computer system device accesses the first computer system resource over the first communication bus. If the first communication bus is busy indicating that another computer system device is accessing a computer system resource over the first communication bus, a determination is then made that the second communication bus is not busy and the requested resource is not busy, and access to the first computer system resource by the first computer system device is allowed over the second communication bus, generally simultaneously with another computer system device accessing another system resource over the first communication bus.

BRIEF DESCRIPTION OF THE DRAWINGS

These and other features and advantages of the present invention will be better understood by reading the following detailed description, taken together with the drawings wherein.

DETAILED DESCRIPTION OF THE INVENTION

Figure 1:
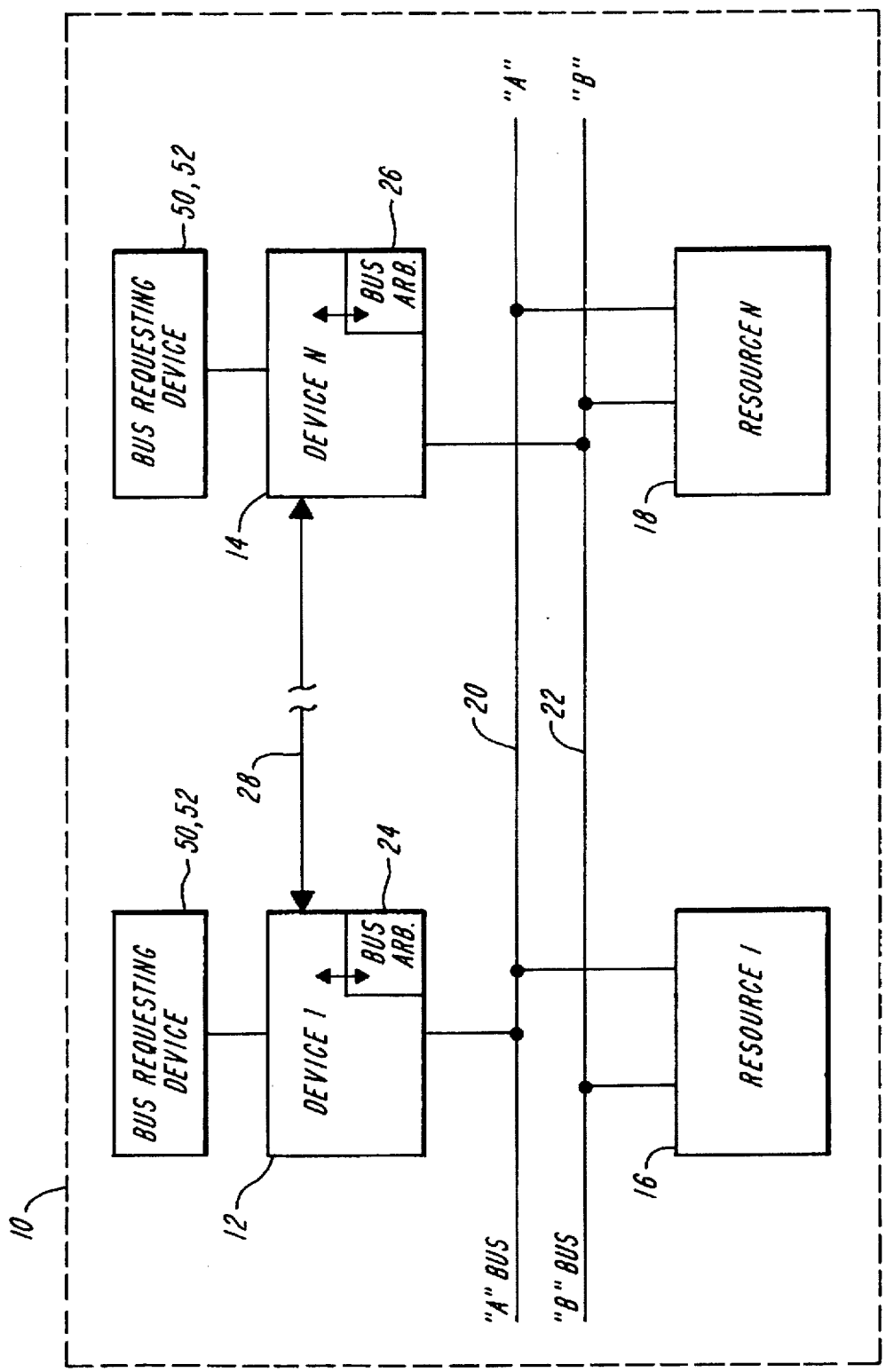
FIG. 1 is a block diagram of the dual bus architecture of the present invention.

The dual bus computer system architecture according to the present invention is shown implemented on computer system 10, FIG. 1, which includes at least first and second computer system devices 12 and 14 respectively. For purposes of describing the invention, a computer system device also referred to herein as simply a device, is to be regarded in its broadest sense to encompass any type of device which forms part of a computer system and is capable of receiving, transmitting, or processing data. Such devices include, but are not limited to, host computer interfaces and interface controllers, data processors or data processing modules performing arithmetic computations, peripheral controllers such as disk drive or printer controllers, memory interfaces and memory management units, and system controllers. The term computer system is to be similarly given the broadest possible definition namely, two or more computer system devices coupled to two or more shared system resources.

Shared system resources 16 and 18 as illustrated in the figure include, but are not limited to such devices as memory (cache), mass storage devices, or other similar types of devices including the computer system devices described above.

Each of the computer system devices 12 and 14 are coupled to each and every system resource 16 and 18 by means of dual, parallel busses 20 and 22. Each of the busses includes address lines and data lines, the number of which are dependent upon the computer system design. For example, a nominal computer system requirement includes a 32 bit wide address bus and a 64 bit wide data bus as well as several bus control lines.

Although each of the computer system devices 12,14 are coupled to each of the busses 20,22, only one computer system device may utilize the bus at any given moment in time. Accordingly, a bus arbitrator is provided to arbitrate requests for access to each of the busses from each of the computer system devices.

Accordingly, first and second bus arbitrators such as bus arbitrator 24, located in computer system device 12, are provided to perform this task. Various bus arbitrator circuits and methodologies for controlling access to a bus by a number of connected devices are well known to those skilled in the art.

In one embodiment, a first bus arbitrator such as bus arbitrator 24 located on computer system device 12 performs bus arbitration for the first or "A" bus 20, while a second bus arbitrator 26 located on computer system device 14 performs bus arbitration for the second or "B" bus 22.

In a further embodiment, each of the computer system devices may be coupled by an optional message bus 28 which allows the devices to communicate with one another for purposes such as requesting access to one of the busses. The optional message bus 28 is typically only utilized to facilitate and enhance inter-device communication which would otherwise be performed over the A and B busses.

Figure 2:
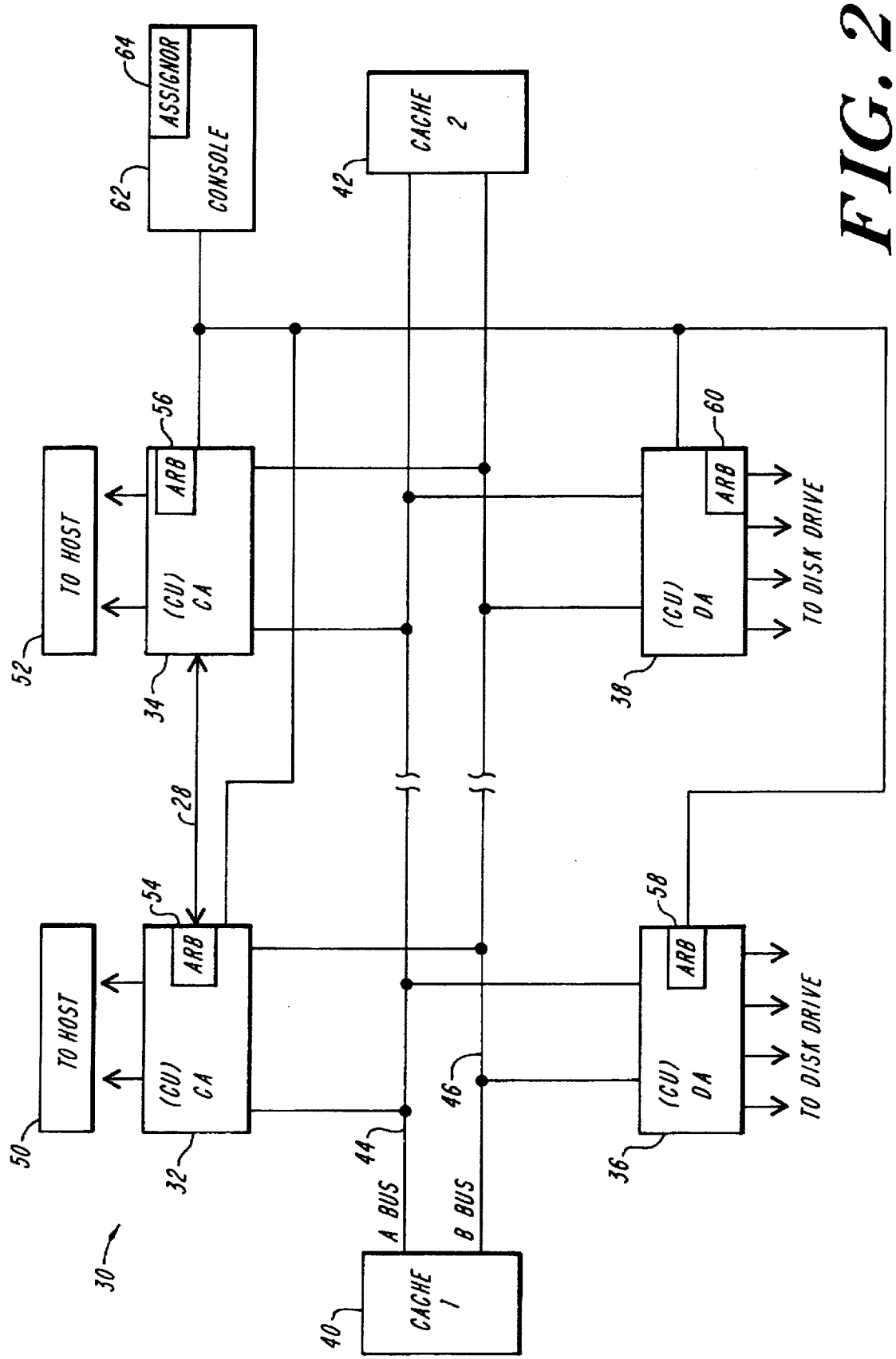
FIG. 2 is a more detailed block diagram of one implementation of a computer system with dual bus architecture according to the present invention.

A preferred implementation of the dual bus architecture of the present invention is shown on computer system 30, FIG. 2, which includes a plurality of computer system devices 32–38 coupled to first and second system resources 40–42, which in this embodiment are cache memory units. The computer system devices and the cache memory units are coupled to one another by means of first and second busses 44 and 46 respectively.

The exemplary computer system 30 is designed to provide mass data storage to one or more bus requesting device such as host systems 50,52. Accordingly, in the preferred embodiment, computer system devices 32–38 are identical control units which may be user defined to operate as either channel adapters, interfacing with the host system, or disk adapters, interfacing with one or more disk drives. Therefore, the exemplary configuration illustrates computer system devices 32 and 34 as channel adapters, whereas devices 36–38 are utilized as disk adapters, which serve to store the data received from the host systems to one or more disk drives- Such control unit devices which are user selectable as either channel adapters or disk adapters are described in allowed, co-pending U.S. patent application Ser. No. 07/587,253 assigned to the common assignee of the present invention and incorporated herein by reference.

In the preferred embodiment, each computer system device 32–38 includes a bus arbitrator 54–60. In this embodiment, two of the bus arbitrators such as bus arbitrator 54 and 56 are arbitrarily or selectively designated as the primary bus arbitrators for the A and B bus respectively. Such designation is typically performed by the system under control of the system's software. In another embodiment, bus arbitrator designation may take place from a bus arbitrator assignor 64 located, for example, at a system manager or administrator's console 62, which is coupled to each of the computer system devices.

In the event that the system detects a failure of one of the computer system devices performing bus arbitration on either of the two busses 44,46, the dual bus architecture of the present invention allows the system to utilize the other functional bus to assign another of the computer system devices such as device 36 or 38 to take over the functions of bus arbitration for the bus controlled by the failed device. Accordingly, full redundancy in bus operation and control is provided while maintaining system throughput. Most importantly, should one of the busses fail, the system will remain completely functional, although with some loss of system performance, by utilizing the remaining bus and bus arbitrator which have not failed. In addition, the system can continue to operate while repairs are performed to remedy the failed bus condition.

Figure 3:
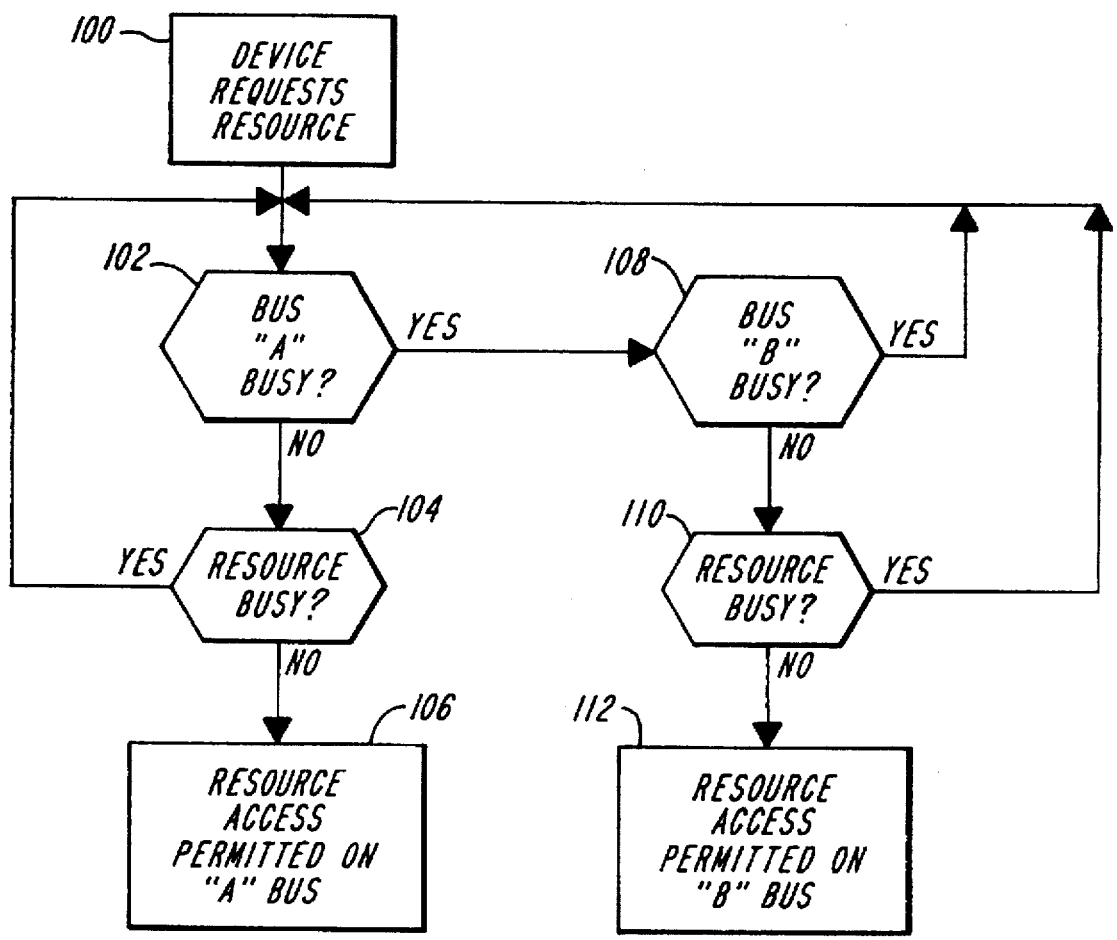
FIG. 3 is a flowchart illustrating the method of accessing a plurality of system resources by a plurality of computer devices, each coupled to the dual bus architecture according to the present invention.

Operation of computer system 30 embodying the dual bus architecture of the present invention will be further explained in conjunction with the flow chart of FIG. 3 wherein at step 100, one computer system device requests access to a resource. For example, device 32, configured as a channel adapter coupled to host 50, may have data which it has received from host 50 to be written to disk. To optimize performance of computer system 30, the data will instead be written to a cache memory such as cache 40 for temporary storage. Subsequently, disk adapter 36 will, periodically when not servicing disk drives, read cache 40 for any data that must be written to disk.

Thus, after requesting access to a shared system resource such as cache memory 40, the bus arbitrator for the "A" bus 44, such as arbitrator 54, will ascertain whether the A bus is busy, step 102. If the "A" bus is not busy, and the requested resource such as cache memory is not busy, step 104, access to cache memory 40 by device 32 will be permitted, step 106. If, at step 104, the system determines that the requested resource is busy, the access must wait and control returns to step 102.

If, at step 102, it is determined by the "A" bus arbitrator 54 that the "A" bus is busy, requesting device 32 will query the "B" bus arbitrator 56 as to the status of the "B" bus, step 108. If, at step 108, it is determined that the "B" bus is busy, operation of the computer system with dual bus architecture according to the present invention must return to step 102, to await an available bus.

If the "B" bus is not busy, and provided the requesting device is not accessing a resource which is busy, step 110, the requesting device will be permitted to access the resource via the "B" bus, step 112. Thus, almost twice the bandwith of data transfer may be accomplished by enabling two devices to transfer data to and from two shared system resources simultaneously. Further, since the two busses operate asynchronously, neither bus is dependent upon the other. Both bus arbitrators work in parallel and need not be synchronized with one another.

Modifications and substitutions by one of ordinary skill in the art are considered to be within the scope of the present invention which is not to be limited except by the claims which follow.

We claim:

1. A computer system, comprising:

a plurality of computer system devices;

a plurality of computer system resources;

first and second communication buses coupled to each of said plurality of computer system devices and to each of said plurality of computer system resources, for allowing access to one of said plurality of system resources by one of said plurality of computer system devices over said first communication bus and said second communication bus;

at least first and second bus access arbitrators, said first bus access arbitrator disposed in a first one of said plurality computer system devices, for allowing a first bus requesting device coupled to said first one of said plurality of computer system devices to access a first one of said plurality of computer system resources over said first communication bus, said second bus access arbitrator disposed in a second one of said plurality of computer system devices, for allowing a second bus requesting device coupled to said second one of said plurality of computer system devices to access a second one of said plurality of computer system resources over said second communication bus;

a message bus, coupled to at least one pair of first and second computer system devices, for allowing inter-device communication between at least first and second computer system devices of said at least one pair of computer system devices;

wherein said first and second bus access arbitrators cooperate in an event that one of said first and second communication buses is inaccessible while the other of said first and second communication buses is accessible, to allow a bus access arbitrator for said accessible bus to allow access to a non-busy computer system resource by a requesting computer system device utilizing said message bus which allows said first bus requesting device to access said second communication bus through said second computer system device, and said second bus requesting device to access said first communication bus through said first computer system device;

said computer system further including a bus arbitrator assignor, for selecting said first bus access arbitrator of said first one of said plurality of computer system devices, for performing bus arbitration of said first communication bus, and for selecting said second bus access arbitrator of said second one of said plurality of computer system devices, for controlling bus arbitration of said second communication bus;

wherein said bus arbitrator assignor is operative for reassigning bus arbitration of at least one of said first and second communication buses from at least one of said first and second bus access arbitrators disposed on said first and second one of said plurality of computer system devices, to at least a third bus access arbitrator disposed on a third one of said plurality of computer system devices; and wherein said bus arbitrator assignor re-assigns at least one of said first and second bus access arbitrators upon a failure of at least one of said first and second one of said plurality of computer system devices.

2. The computer system of claim 1 wherein said computer system further includes a computer system manager; and
said computer system manager includes said bus arbitrator assignor.

3. The computer system of claim 1 wherein each of said plurality of computer system devices includes a bus arbitrator assignor.

4. The computer system of claim 1 wherein each of said plurality of computer system resources includes a bus arbitrator.

5. The computer system of claim 1 wherein each of said first and second communication busses includes an address bus segment and a data bus segment.

6. The computer system of claim 1 wherein each of said plurality of computer system resources is coupled to said message bus for allowing direct inter-resource communication.

7. The computer system of claim 1 wherein said plurality of computer system devices are selected from a group consisting of data processing devices, data communication devices and peripheral control devices.

8. A method of accessing a plurality of computer system resources coupled to first and second communication busses, by a plurality of computer system devices coupled to said first and second communication busses comprising the steps of:

requesting access to a first computer system resource over said first communication bus by a first computer system device via a first bus access arbitrator associated with said first computer system device;

determining said first communication bus is not busy and accessing said first computer system resource by said first computer system device over said first communication bus; and upon determining said first communication bus is busy, performing the steps of:

determining said second communication bus is not busy; and accessing said first computer system resource by said first computer system device over said second communication bus via a second bus access arbitrator associated with said second computer system device.

9. A multi-bus computer system, comprising:

at least first and second bus requesting devices, at least said first bus requesting device coupled to at least a first computer system device, at least said second bus requesting device coupled to at least a second computer system device;

a plurality of computer system resources;

first and second communication buses, both said first and second communication buses coupled to each of said plurality of computer system resources, and wherein said first communication bus is coupled to at least said first computer system device and said second communication bus is coupled to at least said second computer system device, for allowing access to one of said plurality of system resources by one of said first and second bus requesting devices over said first communication bus and said second communication bus;

at least first and second bus access arbitrators, said first bus access arbitrator disposed in said first computer system device, for allowing said first bus requesting device coupled to said first computer system device to access a first one of said plurality of computer system resources over said first communication bus, said second bus access arbitrator disposed in said second computer system device, for allowing said second bus requesting device coupled to said second computer system device to access a second one of said plurality of computer system resources over said second communication bus;

a third bus, coupled to at least one pair of first and second computer system devices, for allowing inter-device communication between at least first and second communication devices of said at least one pair of computer system devices; and wherein said first and second bus access arbitrators cooperate in an event that one of said first and second communication buses is inaccessible while the other of said first and second buses is accessible, to allow a bus access arbitrator for said accessible bus to allow access to a non-busy computer system resource by a requesting computer system device utilizing said third bus which allows said first bus requesting device to access said second communication bus through said second computer system device and said second bus access arbitrator, and said second bus requesting device to access said first communication bus through said first computer system device and said first bus access arbitrator.

10. An apparatus for providing access to a plurality of computer system resources by a plurality of computer system devices comprising:

first arbitration means coupled to one of said plurality of computer system devices and responsive to a first computer system device requesting access to a first computer system resource over a first communication bus, for determining whether said first communication bus is available for access and for allowing said first computer system device to access said first computer system resource over said first communication bus when said first communication bus is available for access;

second arbitration means coupled to another one of said plurality of computer system devices, responsive to said first arbitration means indicating that said first communication bus is not available for access, for determining whether a second communication bus is available for access and for allowing said first computer system device to access said first computer system resource over said second communication bus.

11. The apparatus as in claim 10 wherein each of said computer system resources is coupled to both said first and second communication buses.

12. The apparatus as in claim 11 wherein said first computer system device and said second computer system device are coupled to said first communication bus and said second communication bus respectively.

13. The apparatus as in claim 11 wherein each of said first and second computer system devices are coupled to both said first and second communication buses.

14. The apparatus as in claim 10 further comprising a third communication bus for interconnecting said first computer system device and said second computer system device.

15. The apparatus as in claim 14 wherein said access of said first computer system resource over said second communication bus by said first computer system device occurs via said third communication bus.

16. An apparatus for providing access to a plurality of computer system resources by a plurality of requesting devices comprising:

first and second communication buses, each for providing access to each of said plurality of computer system resources by said plurality of requesting devices;

a message bus for providing a communications path between a first one of said plurality of requesting devices and a second one of said plurality of requesting devices;

first and second bus arbitrators associated with said first one of said requesting devices and said second one of said requesting devices respectively, said second bus arbitrator configured to allow said first one of said requesting devices to access said plurality of computer system resources via said second communication bus when said first bus arbitrator indicates that said first communication bus is not available for access.

* * * * *